United States Patent
Byun et al.

(10) Patent No.: US 6,577,913 B2
(45) Date of Patent: *Jun. 10, 2003

(54) CUTTING AND SORTING AUTOMATION SYSTEM AND METHOD FOR MANUFACTURING A LIQUID CRYSTAL DEVICE USING THE SAME

(75) Inventors: Sung-Joon Byun, Choongcheongnam-do (KR); Jong-Beom An, Choongcheongnam-do (KR); Min-Young Heo, Choongcheongnam-do (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,393

(22) Filed: Jun. 9, 1999

(65) Prior Publication Data

US 2002/0173871 A1 Nov. 21, 2002

(30) Foreign Application Priority Data

Nov. 26, 1998 (KR) .............................. 98-50882

(51) Int. Cl.⁷ .............................. G06F 19/00
(52) U.S. Cl. .................. 700/121; 700/116; 700/219; 700/226
(58) Field of Search ................ 700/121, 110, 700/109, 112, 116, 215, 217, 219, 221, 223, 224, 225, 226, 115; 438/5, 33, 30, 149; 83/79, 102

(56) References Cited

U.S. PATENT DOCUMENTS

| | | | | |
|---|---|---|---|---|
| 3,897,626 | A | * | 8/1975 | Beausoleil ................. 438/5 |
| 4,027,246 | A | * | 5/1977 | Caccoma et al. ........... 700/121 |
| 5,378,145 | A | * | 1/1995 | Ono et al. ................. 432/152 |
| 5,806,574 | A | * | 9/1998 | Yamashita et al. ........... 141/63 |
| 5,975,741 | A | * | 11/1999 | Kawaguchi et al. ........ 700/121 |
| 5,980,591 | A | * | 11/1999 | Akimoto et al. .......... 29/25.01 |
| 6,013,112 | A | * | 1/2000 | Iizuka et al. ............. 29/25.01 |
| 6,067,507 | A | * | 5/2000 | Beffa ...................... 702/118 |
| 6,122,563 | A | * | 9/2000 | Beffa ...................... 700/121 |
| 6,146,929 | A | * | 11/2000 | Oana et al. ................ 438/151 |
| 6,190,224 | B1 | * | 2/2001 | Byun et al. ................. 445/24 |
| 6,222,145 | B1 | * | 4/2001 | Cook et al. ................. 209/573 |
| 6,286,685 | B1 | * | 9/2001 | Kononchuk et al. ........... 209/2 |
| 6,314,332 | B1 | * | 11/2001 | Kida ........................ 700/113 |

* cited by examiner

Primary Examiner—Leo Picard
Assistant Examiner—Paul Rodriguez
(74) Attorney, Agent, or Firm—McGuireWoods LLP; Hae-Chan Park

(57) ABSTRACT

Disclosed are a system for workpiece cutting and sorting automation, and a method for controlling the system. The system includes a cutting/sorting equipment for cutting a substrate having a plurality of cells into cut substrates, and sorting the cut substrates according to a predetermined mode; and a system controller for receiving a request for operation information on the cut substrates from the cutting/sorting equipment, and transmitting the operation information and operation commands to the cutting/sorting equipment. The method includes the steps of (a) determining an operating mode of the cut substrates; (b) sorting the cut substrates and supplying the sorted cut substrates to one of the plurality of cassettes according to the operating mode of the cut substrates determined in step (a); and (c) repeating steps (a) and (b) for a predetermined lot number of cut substrates.

15 Claims, 6 Drawing Sheets

CUTTING AND SORTING AUTOMATION SYSTEM AND METHOD FOR MANUFACTURING A LIQUID CRYSTAL DEVICE USING THE SAME

BACKGROUND OF THE INVENTION (a) Field of the Invention

The present invention relates to a cutting and sorting automation system, and more particularly to a system used in a TFT-LCD manufacturing process for simultaneously cutting and sorting substrates having defective cells. The present invention also relates to a method for controlling such a system.

(b) Description of the Related Art

The TFT-LCD (thin film transistor liquid crystal display) applies an electric field to a liquid crystal layer injected between two substrates. The liquid crystal has an anisotropic dielectricity. The two substrates, typically a TFT substrate and a CF (color filter) substrate, are arranged substantially in parallel having a predetermined gap therebetween, and the amount of light permeating the substrates is controlled by the electric field applied to the liquid crystal. A plurality of pixel electrodes and TFTs are formed on the TFT substrate, and a RGB color filter and a black matrix are formed on the CF substrate.

To improve productivity in the TFT-LCD manufacturing process, a mother glass substrate forms a plurality of panels (hereinafter, "cell") on it, and each cell forms one TFT-LCD panel. In other words, after forming a plurality of cells (e.g., 4, 6, 8 cells) on a whole TFT substrate and a whole CF substrate, the two substrates are assembled together and cut into each of the TFT-LCD panel. However, while manufacturing the whole TFT and CF substrates, defects may occur in one or more of the cells. If one of the substrate of a TFT-LCD panel is defective, the entire resulting TFT-LCD panel must be discarded.

To solve the above problem, the whole TFT and CF substrates having defective cells are cut, for example, to one-half or one-third size, sorted by defects, and assembled together for TFT-LCD panels.

FIG. 1 shows a block diagram of a cutting and sorting system used in the conventional TFT-LCD manufacturing process. As shown in the drawing, cutting and sorting are realized through two separate lines of equipment. A substrates is cut in a substrate cutting line 10 and the cut substrates are sorted in a substrate sorting line 20.

The substrate cutting line 10 comprises a cutting loader 11, a cutter 12, and a cutting unloader 13; while the substrate sorting line 20 comprises a sorting loader 21, a sorter 22, and a sorting unloader 23. A substrate (either a whole TFT substrate or a whole CF substrate) having defective cells is supplied to the cutting loader 11 of the substrate cutting line 10. The substrate is then transferred to the cutter 12 where the substrate is cut to ½ or ⅓ size. When the substrate has a total of six cells formed thereon, the substrate is cut into two or three sections, each section having either three or two cells, respectively.

The cut substrate is then transferred to the cutting unloader 13 of the substrate cutting line 10, and the cutting unloader 13 supplies the cut substrate to a conveyor 30 provided between the substrate cutting line 10 and the substrate sorting line 20. After a predetermined number of cut substrates has been supplied to the conveyor 30 in this manner, the conveyor 30 then supplies the substrates to the sorting loader 21 of the substrate sorting line 20. Next, the sorting loader 21 transfers the cut substrates to the sorter 22. The sorter 22 sorts out the substrates according to predetermined grades and sends them to the sorting uloader 23. The sorting unloader 23 stores them in a plurality of cassettes 24a, 24b, 24c according to a grade.

In a conventional TFT-LCD manufacturing process, substrates having defective cells are cut and sorted in two separate process lines as described above, and a conveyor for the substrates is provided between the two lines. As a result, overall manufacturing costs are increased by the large amount of equipment used. Further, such a separation of processes increases the time for manufacturing TFT-LCDs and thereby lowers the overall productivity.

SUMMARY OF THE INVENTION

The present invention has been made in an effort to solve the above problems.

It is an object of the present invention to provide a cutting and sorting automation system and a method for controlling the same that simultaneously cuts and sorts defective substrates to reduce manufacturing costs and enhance productivity in a TFT-LCD manufacturing process.

To achieve the above object, the present invention provides a cutting and sorting automation system and a method for controlling the same. The system includes a cutting/sorting equipment for cutting a substrate having a plurality of cells to form cut substrates, and sorting the cut substrates according to a predetermined mode; and a system controller for receiving a request for operation information on the cut substrates from the cutting/sorting equipment, and transmitting the operation information and operation commands to the cutting/sorting equipment.

According to a feature of the present invention, the cutting/sorting equipment includes a loader for receiving a cassette storing the substrate from a stocker or such an equipment, and holding the cassette; a cutter for receiving the substrate in the cassette from the loader and cutting the substrate to predetermined sizes to form the cut substrates; a substrate ID reader for reading IDs of the cut substrates received from the cutter; and an unloader for receiving the cut substrates from the substrate ID reader, and sorting the cut substrates according to a read result of the cut substrates and a predetermined operating mode.

According to another feature of the present invention, the substrate ID reader includes a handling table on which the cut substrates are placed; and a cut substrate reader for reading the IDs of the cut substrates to determine a position and a defective grade of the cut substrates.

According to yet another feature of the present invention, the unloader includes a cassette storing station on which a plurality of cassettes containing the cut substrates are placed; and a first conveying robot supplying each of the cut substrates in one of the cassettes on the cassette storing station according to what the cut substrate reader has read and a predetermined operating mode.

According to still yet another feature of the present invention, the loader includes a plurality of ports on which the cassette storing the substrate is placed; and a second conveying robot for removing the substrate from the cassette placed on one of the ports and sending the substrate to the cutter.

According to still yet another feature of the present invention, the operating mode is a sequence mode in which the cut substrates are supplied to the cassettes placed on the cassette storing station in sequence, i.e., to one of the cassettes until the cassette is full, then to the subsequent cassette.

According to still yet another feature of the present invention, the operating mode is a position mode in which the cut substrates are supplied to the cassettes placed on the cassette storing station according to a position from which the cut substrates were cut from the uncut substrate.

According to still yet another feature of the present invention, the operating mode is a grade mode in which the cut substrates are supplied to the cassettes placed on the cassette storing station according to predetermined defective grades of the cut substrates.

The method includes the steps of (a) determining an operating mode; (b) sorting the cut substrates and supplying the sorted cut substrates to one of the plurality of cassettes according to the operating mode; and (c) repeating steps (a) and (b) for a predetermined lot number of cut substrates.

According to a feature of the method of the present invention, the step (b) further includes the steps of receiving cut substrate information including a cut substrate ID and a cut substrate grade from a host; determining grades of the cut substrates based on the information transmitted from the host by reading the IDs of the cut substrates; and supplying the cut substrates to the cassettes according to the grades of the cut substrates.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Preferred embodiments of the present invention will now be described in detail with reference to the accompanying drawings.

Figure 1:
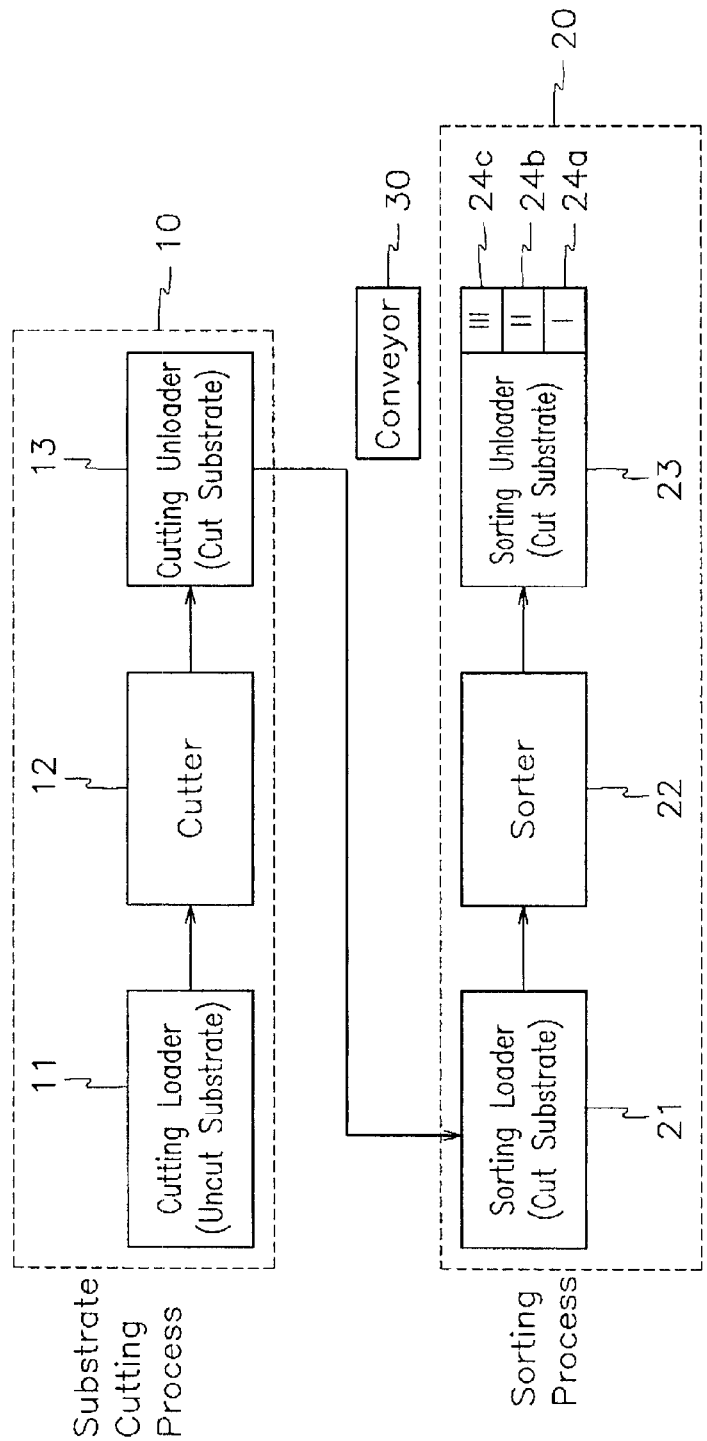
FIG. 1 is a block diagram of a cutting and sorting system used in the conventional TFT-LCD manufacturing process.
Figure 2:
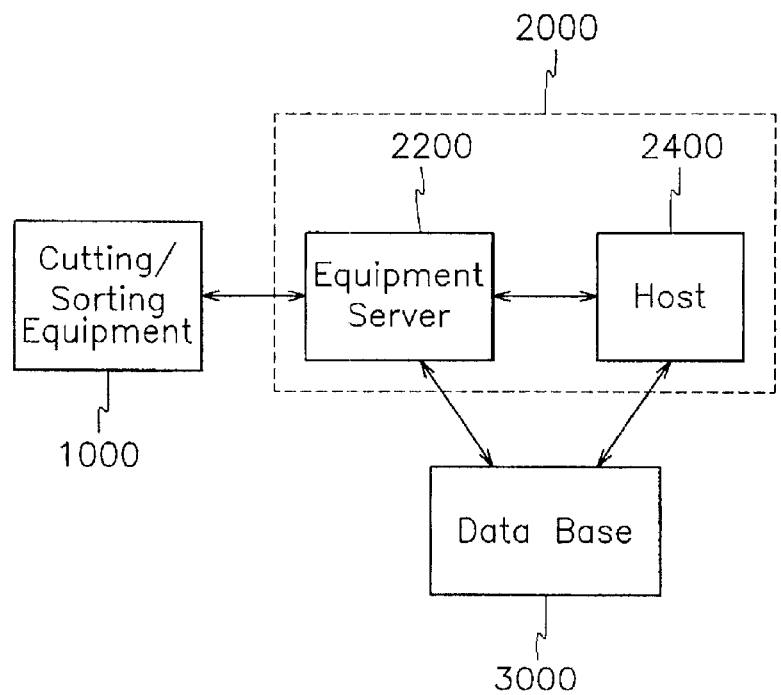
FIG. 2 is a block diagram of a cutting and sorting automation system according to a preferred embodiment of the present invention.

FIG. 2 shows a block diagram of a cutting and sorting automation system according to a preferred embodiment of the present invention. As shown in the drawing, the automation system comprises cutting/sorting equipment 1000; a system controller 2000, including an equipment server 2200 and a host 2400; and a database 3000.

The cutting/sorting equipment 1000 cuts substrates having defective cells according to operation commands from the system controller 2000, then sorts the cut substrates depending on predetermined defect grades of the cut substrates. The system controller 2000 receives requests for operation information regarding the substrates from the cutting/sorting equipment 1000, then transmits operation commands and required operation information to the cutting/sorting equipment 1000. Operation information of each substrate is stored in the database 3000. The host 2400 of the system controller 2000 transmits operation information referring to each substrate to the cutting/sorting equipment 1000 via the equipment server 2200, and receives information of operation results from the cutting/sorting equipment 1000 also through the server 2200. Accordingly, the equipment server 2200 acts as an interface between the host 2400 and the cutting/sorting equipment 1000.

Figure 3:
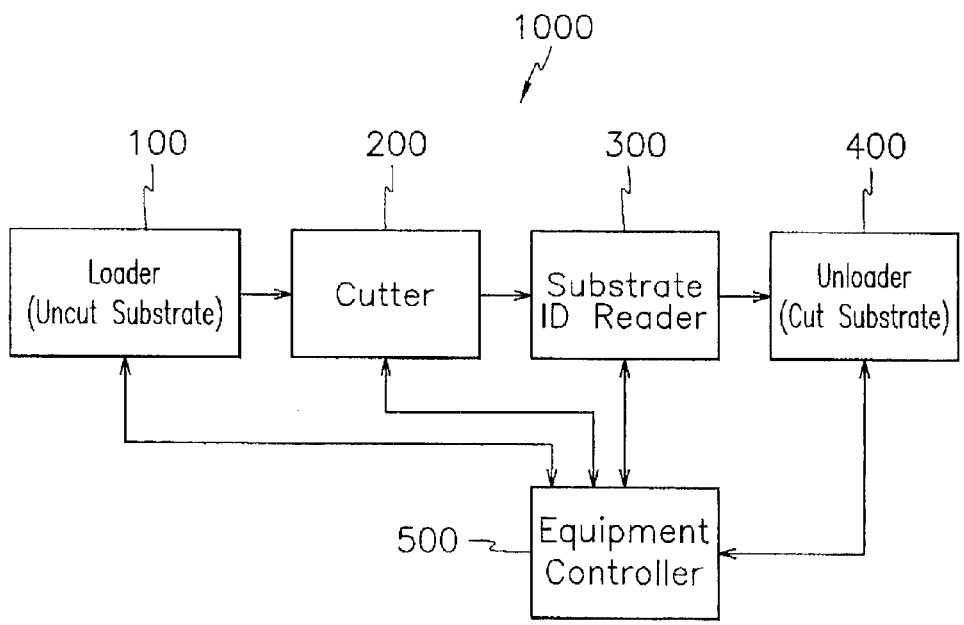
FIG. 3 is a block diagram of cutting/sorting equipment shown in FIG. 2.
Figure 4:
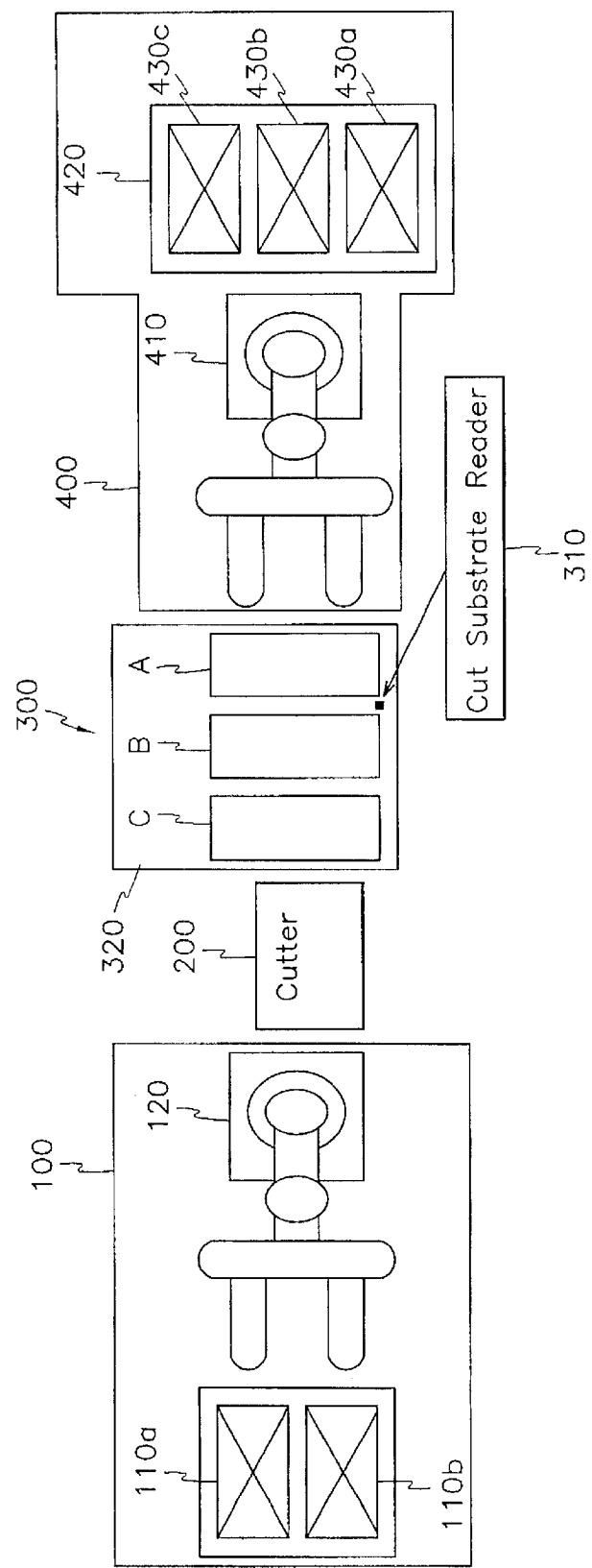
FIG. 4 is a detailed view of the cutting/sorting equipment shown in FIG. 2.

FIG. 3 shows a block diagram of the cutting/sorting equipment 1000 shown in FIG. 2, and FIG. 4 shows a detailed view of the cutting/sorting equipment 1000 shown in FIG. 2. First, as shown in FIG. 3, the cutting/sorting equipment 1000 comprises a loader 100, a cutter 200, a substrate ID reader 300, an unloader 400, and an equipment controller 500.

With reference also to FIG. 4, the loader 100 includes ports 110*a* and 110*b* on which cassettes are placed, and a conveying robot 120. Cassettes filled with substrates (TFT or CF substrates) having defective cells are transmitted by a stocker or other such an equipment and placed on top of one of the ports 110*a* and 110*b*. The cutter 200 receives the substrates stored in the cassettes by the conveying robot 120 of the loader 100, and cuts the substrates into predetermined sizes according to commands given by the user or commands received from the host 2400 of the system controller 2000. For a simple description, it will be assumed that the whole substrates have six cells and that the cutter 200 cuts the whole substrates into one-third of their original size such that the resulting cut substrates are cut to a two-cell size.

The substrate ID reader 300 includes a handling table 320 and a cut substrate reader 310; Cut substrates A, B and C are placed on the handling table 320, and the cut substrate reader 310 reads IDs of the cut substrates, thereby determining a position of the cut substrates (i.e., a position where the cut substrate was cut from the original, whole substrate), as well as a defect grade of the cut substrates. This information determined by the cut substrate reader 310 is transmitted to the system controller 2000 via the equipment controller 500 of the cutting/sorting equipment 1000.

The unloader 400 of the cutting/sorting equipment 1000 includes a conveying robot 410 and a cassette storing station 420. After the IDs of the cut substrates are read by the cut substrate reader 310, the cut substrates are placed in either a first cassette 430*a*, second cassette 430*b*, or third cassette 430*c*, provided on the cassette storing station 420, by the conveying robot 410. At this time, the conveying robot 410 transmits the cut substrates from the substrate ID reader 300 to the first cassette 430*a*, second cassette 430*b* or third cassette 430*c*, depending on what the cut substrate reader 310 has read and according to a predetermined operating mode.

The equipment controller 500 of the cutting/sorting equipment 1000 controls the operation of the loader 100, cutter 200, substrate ID reader 300, and unloader 400. It also transmits and receives operation information to and from the system controller 2000.

The different predetermined operating modes described above by which the conveying robot 410 of the unloader 400 transmits the cut substrates from the substrate ID reader 300 to one of the three cassettes 430*a*, 430*b*, and 430*c* will be described in detail hereinbelow.

The first operating mode supplies the cut substrates to the cassettes 430a, 430b, and 430c of the cassette storing station 420 in sequence (hereinafter referred to as a "sequence mode"). According to the sequence mode, the cut substrates transferred from the substrate ID reader 300 are loaded in the first cassette 430a until it is full and then the cut substrates are loaded in the second cassette 430b. After the third cassette 430c has been filled in this manner, the conveying robot 410 begins to fill the first cassette 430a, which, in the meantime, has been emptied and placed back on the cassette storing station 420.

The second operating mode supplies the cut substrates to the cassettes 430a, 430b, and 430c according to a position where the cut substrate was cut from the original, whole substrate (hereinafter referred to as a "position mode"). That is, for example, if the cut substrate has been cut from a left side of the original substrate, the cut substrate is supplied to the first cassette 430a; if the cut substrate has been cut from a middle of the original substrate, the cut substrate is supplied to the second cassette 430b; and if the cut substrate has been cut from a right side of the original substrate, the cut substrate is supplied to the third cassette 430c. This position mode is particularly useful when defects occur repetitively in particular areas of the original substrate or when particular areas of the original substrate must be specially checked for defects.

Figure 5:
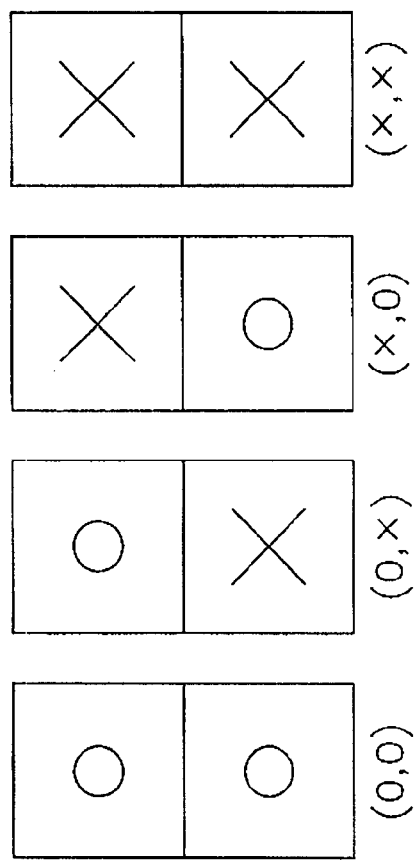
FIG. 5 is a diagram for illustrating an example of defect grades according to a preferred embodiment of the present invention.

In a third operating mode, the cut substrates are supplied to the cassettes 430a, 430b, and 430c according to a defect grade of the cut substrates (hereinafter referred to as a "grade mode"). In more detail, there are a total of 4 possible defect patterns in the substrates that have been cut to have two cells each. That is, as shown in FIG. 5, it is possible to have a substrate where both an upper cell and a lower (in the drawing) cell are non-defective or normal (O, O); the upper cell is normal and the lower cell is defective (O, X); the upper cell is defective and the lower cell is normal (X, O); and both the cells are defective (X, X). In the grade mode, the cut substrates are stored in one of the three cassettes 430a, 430b, and 430c according to the defect grade. Table 1 below illustrates an example of three storage modes-storage mode 1, storage mode 2, and storage mode 3.

TABLE 1

|  | Storage Mode 1 | Storage Mode 2 | Storage Mode 3 |
|---|---|---|---|
| First Cassette | (O, O) | (O, O) | (O, O) |
| Second Cassette | (O, O) | (O, X) | (X, O) |
| Third Cassette | (O,X), (X,O), (X,X) | (X, O), (X, X) | (O, X), (X, X) |

As shown in Table 1 above, in storage mode 1, cut substrates having both of normal cells are supplied to the first and second cassettes 430a and 430b, while cut substrates one or both of which cells are defective are supplied to the third cassette 430c.

In storage mode 2, cut substrates having both of normal cells are supplied to the first cassette 430a. Cut substrates whose upper cell is normal and whose lower cell is defective are supplied to the second cassette 430b. Cut substrates either whose upper cell is defective and whose lower cell is normal or both of which cells are defective are supplied to the third cassette 430c.

Finally, in storage mode 3, cut substrates having both of normal cells are supplied to the first cassette 430a. Cut substrates whose upper cell is defective and whose lower cell is normal are supplied to the second cassette 430b. Cut substrates either whose upper cell is normal and whose lower cell is defective or both of which cells are defective are supplied to the third cassette 430c.

The frequency of a certain defective pattern of the cut substrates determines which of the above storage modes to use. For example, when many of the cut substrates have cells that are both normal, it is best to use storage mode 1.

The operation of the cutting/sorting equipment 1000 as described above will be explained hereinafter.

Figure 6:
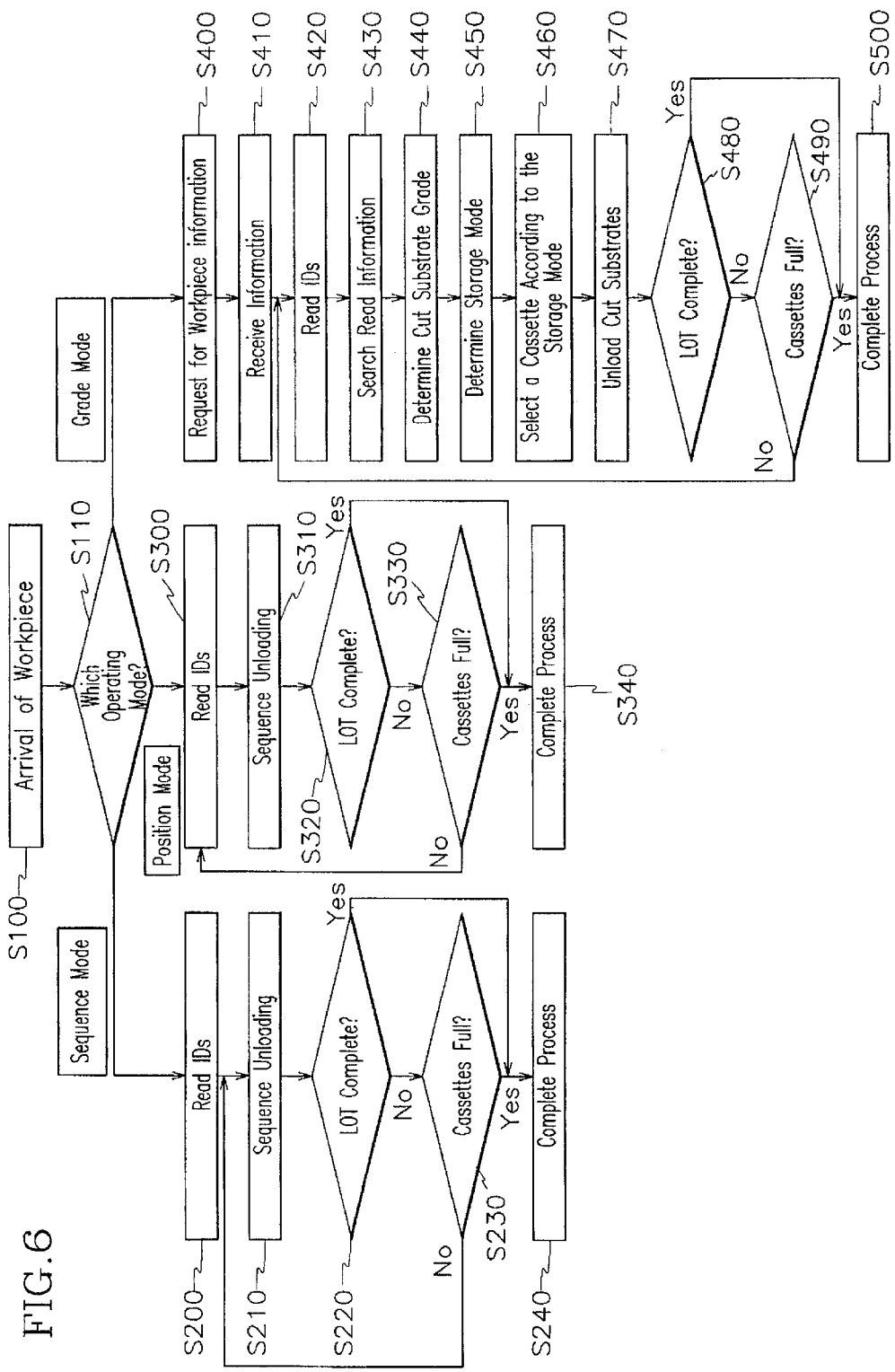
FIG. 6 is a flow chart of a control method of the cutting/sorting equipment according to a preferred embodiment of the present invention.

FIG. 6 shows a flow chart of a control method of the cutting/sorting equipment 1000 according to a preferred embodiment of the present invention.

In step S100, the workpieces, or cut substrates, arrive at the substrate ID reader 300 from the cutter 200. Next, in step S110, it is determined which operating mode—sequence mode, position mode, and grade mode—the system of the present invention is in. Here, it is possible to flip the order of steps S100 and S110 such that the cut substrates arrive at the ID reader 300 after determining which mode will be used to supply the cut substrates to the cassettes 430a, 430b, and 430c.

In step S110, if the system is in a sequence mode, an ID of a cut substrate is read in step S200, and the cut substrate is then unloaded in sequence in step S210. On the other hand, if it is determined that the system is in a position mode in step S110, an ID of a cut substrates is read in step S300, then the substrate is unloaded according to the position of the cut substrate (i.e., from where in the original substrate the cut substrate has been cut) in step S310.

However, if the system is in a grade mode in step S110, a request is made to the host 2400 of the system controller 2000 for information regarding the cut substrate in step S400, and the information is received from the host 2400 in step S410. Next, after reading the ID of the cut substrate in step S420, the read information is searched based on the information from the host 2400 in step S430, thereby determining the grade of the cut substrate in step S440. Following this step, it determines which storage mode to use in step S450. Next, it is determined, according to the storage mode, to which cassette of 430a, 430b, and 430c the cut substrate will be supplied in step S460. Then, the cut substrate is unloaded into the correct cassette 430a, 430b, and 430c in step S470.

In each of the above modes, after unloading of the cut substrate, the steps are repeated for subsequent cut substrates. After unloading the cut substrates in each mode, the cutting and sorting process finishes either when it is determined that a predetermined number of substrates, or a "lot", has been reached, or when it is determined that the cassettes are full in steps S220, S230, and S240, steps S320, S330, and S340, or steps S480, S490, and S500.

Figure 7:
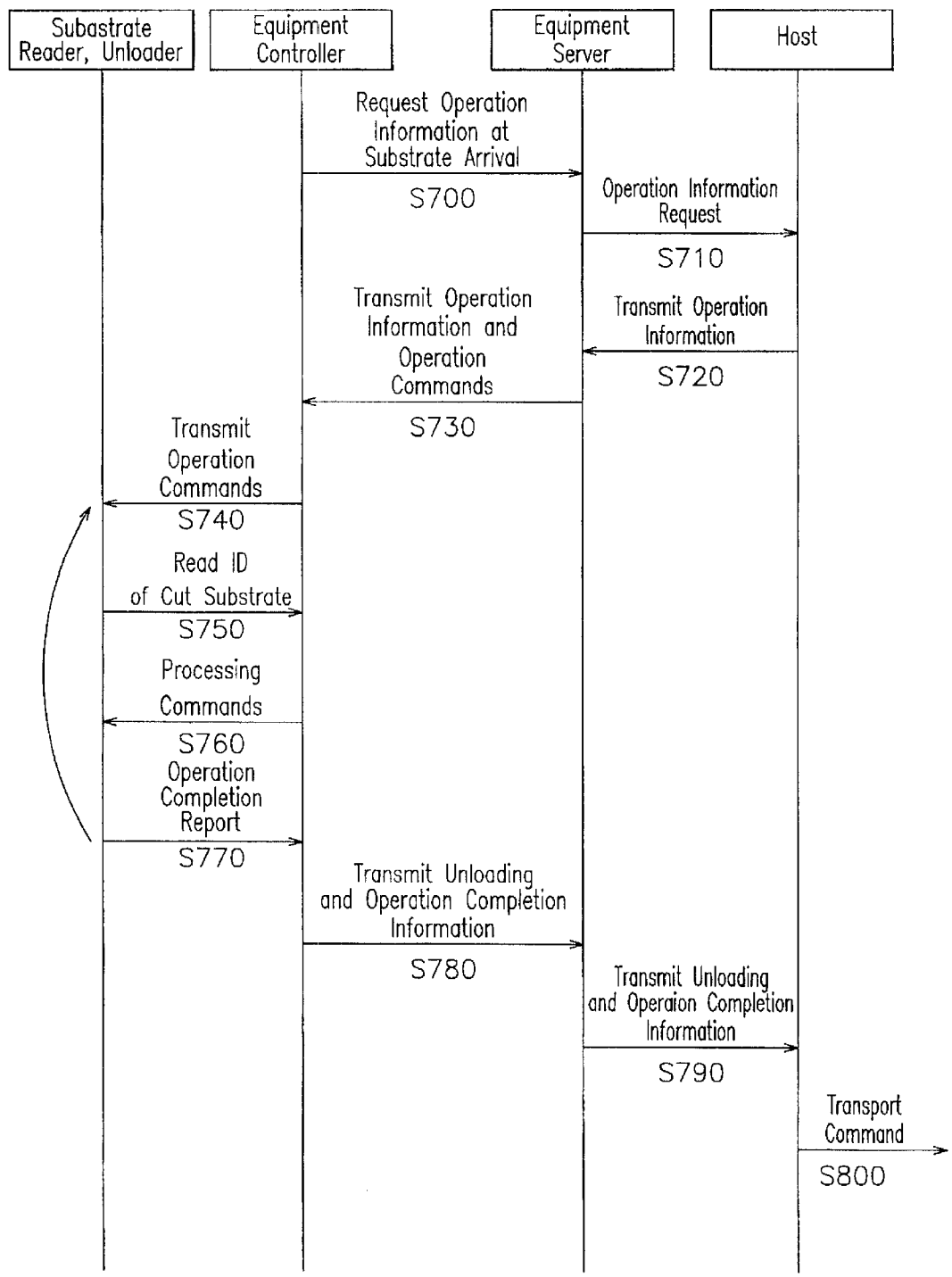
FIG. 7 is a diagram for illustrating a flow of messages between cutting/sorting equipment, an equipment server and a host in the case where a grade mode is an operating mode.

In the above method according to a preferred embodiment of the present invention, when the system is in a grade mode in step S110, information flows between the cutting/sorting equipment 1000, the system controller 2000, the equipment server 2200 and the host 2400. This will be described in more detail hereinafter with reference to FIG. 7.

First, if a cut substrate arrives at the substrate ID reader 300 of the cutting/sorting equipment 1000, the equipment controller 500 of the cutting/sorting equipment 1000 sends information of the cut substrate to the equipment server 2200, and requests operation information of the arrived substrate from the equipment server 2200 in step S700. At this time, information from the equipment controller 500 to the equipment server 2200 includes a port ID number, a cassette ID number, and a lot ID number of the arrived cut substrate.

Next, the equipment server 2200 transmits the request of the operation information received from the equipment controller 500 to the host 2400 in step S710. The host 2400 transmits operation information on the arrived cut substrate to the equipment server 2200 in step S720. Subsequently, the equipment server 2200 transmits both the operation information and operation commands to the equipment controller 500 of the cutting/sorting equipment 1000 in step S730. At this time, the operation information includes a lot ID number, a substrate number, and a grade type.

Then, the equipment controller 500 transmits operation commands to the substrate ID reader 300 and the unloader 400 in step S740. Following this step, the substrate ID reader 300 and the unloader 400 of the cutting/sorting equipment 1000, according to the received operation commands, read the ID of the cut substrate and send corresponding information of the same to the equipment controller 500 in step S750, receive a processing command from the equipment controller in step S760, then report finishing all operations to the equipment controller 500 in step S770. These steps are repeated by a predetermined number of times.

Next, in step S780, the equipment controller 500 transmits to the equipment server 2200 information that the cut substrates are unloaded and the operations are completed. In step S790, the equipment server 2200 transmits this information to the host 2400. At this time, the information sent to the host 2400 includes an unloaded port ID number, an uncut substrate ID number, a lot ID number, a cut substrate ID number, and a grade type. Finally, after receiving this information from the equipment server 2200, the host 2400 sends a command to transport a cassette to a conveying apparatus in step S800.

In the cutting and sorting automation system and the method for controlling the same of the present invention described above, since substrates are both cut and sorted in a single system, rather than two separate systems as in the prior art, overall manufacturing costs are reduced because less equipment is used, and productivity is enhanced by reducing the processing time.

Although preferred embodiments of the present invention have been described in detail hereinabove, it should be clearly understood that many variations and/or modifications of the basic inventive concepts herein taught that may appear to those skilled in the present art will still fall within the spirit and scope of the present invention, as defined in the appended claims. For example, it will be clear to those skilled in the art to which the present invention pertains that, although the present invention was described in relation to its application in the TFT-LCD manufacturing process, its use in manufacturing plasma display panels and other flat panel display configurations is also possible.

What is claimed is:

1. A system for cutting and sorting automation, comprising:
    a loader for receiving a first cassette storing a substrate from a stocker or other equipment, and for holding the first cassette;
    a cutter for cutting the substrate into a plurality of cut substrates of predetermined sizes after receiving the substrate in the first cassette from said loader;
    a substrate identifier reader for reading an identifier of each cut substrate received from said cutter;
    an unloader for sorting and storing the plurality of cut substrates to a second cassette placed on a cassette storing station according to a read result of each cut substrate and a predetermined operating mode after receiving the plurality of cut substrates from said substrate identifier reader; and
    a system controller for receiving a request for operation information on each cut substrate from said unloader, and transmitting the operation information and operation commands to said unloader,
    wherein when the substrate has a defective cell, said unloader performs the predetermined operating mode to sort the plurality of cut substrates, said predetermined operating mode selected from a plurality of predetermined operating modes comprising:
        (a) a sequence mode in which each cut substrate is supplied in sequence to the second cassette,
        (b) a position mode in which each cut substrate is supplied to the second cassette according to a position where each cut substrate was cut from the substrate, and
        (c) a grade mode in which each cut substrate is supplied to the second cassette according to a predetermined defect grade of each cut substrate.

2. The system of claim 1, wherein the substrate identifier reader comprises:
    a handling table on which each cut substrate is placed; and
    a cut substrate reader for reading the identifier of each cut substrate to determine the position and the defect grade of each cut substrate.

3. The system of claim 1, wherein the unloader comprises a conveying robot for supplying each cut substrate to the second cassette according to what the substrate identifier reader has read and the predetermined operating mode.

4. The system of claim 1, wherein the loader comprises:
    a plurality of ports on which the first cassette storing the substrate is placed; and
    a conveying robot for removing the substrate from the first cassette placed on one of the ports and sending the substrate to said cutter.

5. A method for manufacturing a liquid crystal display (LCD) to control a cutting and sorting equipment including a cutter for cutting a substrate having a plurality of cells into a plurality of cut substrates, and an unloader for sorting each cut substrate in one of a plurality of cassettes according to a selected operating mode, the method comprising the steps of:
    (a) selecting an operating mode from a plurality of operating modes, each operating mode providing a different way of sorting the plurality of cut substrates;
    (b) sorting the plurality of cut substrates and supplying each of the sorted cut substrates to one of the plurality of cassettes according to the selected operating mode; and
    (c) repeating steps (a) and (b) for all the cut substrates in a lot,
    wherein said plurality of operating modes comprising:
        a sequence mode in which each cut substrate is supplied to the cassettes in sequence;
        a position mode in which each cut substrate is supplied to the cassettes according to its position in the substrate from which the cut substrate is cut; and
        a grade mode in which each cut substrate is supplied to the cassettes according to its defect grade.

6. The method of claim 5, wherein, in the position mode, each cut substrate is supplied to the cassettes after reading an identifier of each cut substrate to determine the position of each cut substrate.

7. The method of claim 5, wherein the step of sorting the cut substrates further comprises the steps of:

receiving cut substrate information including an identifier of each cut substrate and a cut substrate grade from a host;

determining a grade of each cut substrate based on information transmitted from the host by reading the identifier of each cut substrate; and supplying each cut substrate to the cassettes according to the grade of each cut substrate.

8. A cutting/sorting equipment comprising:

a loader for receiving a cassette storing a substrate, and for holding the cassette, the substrate having a plurality of cells;

a cutter for cutting the substrate into a plurality of cut substrates of predetermined sizes after receiving the substrate in the cassette from the loader;

a substrate identifier reader for reading an identifier of each cut substrate received from the cutter, wherein the substrate identifier reader includes:

a handling table on which each cut substrate is placed, and a cut substrate reader for reading an identifier of each cut substrate to determine a position and a defect grade of each cut substrate; and an unloader for, sorting the plurality of cut substrates according to a read result of the plurality of cut substrates and a predetermined operating mode after receiving the plurality of cut substrates from the substrate identifier reader;

wherein the substrate has a defective cell.

9. The equipment of claim 8, wherein the unloader comprises:

a cassette storing station on which a plurality of cassettes having each of the cut substrates are placed; and a first conveying robot for supplying each of the cut substrates in one of the cassettes according to what the cut substrate reader has read and a predetermined operating mode.

10. The equipment of claim 9, wherein the loader comprises:

a plurality of ports on which the cassette storing the substrate is placed; and a second conveying robot for removing the substrate from the cassette placed on one of the ports and sending the substrate to the cutter.

11. A method for controlling cutting and sorting equipment including a cutter for cutting a substrate having a plurality of cells into a plurality of cut substrates, and an unloader for sorting each cut substrate in one of a plurality of cassettes, the method comprising the steps of:

receiving cut substrate information including an identifier of each cut substrate and a cut substrate grade from a host;

determining a grade of each cut substrate based on information transmitted from the host by reading the identifier of each cut substrate;

supplying each cut substrate to the cassettes according to the grade of each cut substrate; and repeating the above steps for all the cut substrates in a lot.

12. A method for manufacturing a liquid crystal display (LCD), comprising:

receiving a cassette storing a substrate, each substrate having a plurality of cells, and holding the cassette;

cutting the substrate into a plurality of cut substrates of a predetermined size after receiving the substrate in the cassette;

reading an identifier of each cut substrate; and storing the plurality of cut substrates according to read results of the plurality of cut substrates and a predetermined operating mode.

13. The method of claim 12, wherein the step of storing is performed by an unloader comprising a cassette storing station on which a plurality of cassettes having the cut substrates are placed, and a conveying robot for supplying each cut substrate to one of the cassettes according to the identifier of each cut substrate and the predetermined operating mode.

14. The method of claim 12, wherein the step of receiving is performed by a loader comprising a plurality of ports on which the cassette storing the substrate is placed, and a conveying robot for removing the substrate from the cassette placed on one of the ports.

15. A system for cutting and sorting automation, comprising:

a loader for receiving a first cassette and holding the cassette, said cassette storing a substrate;

a cutter for cutting the substrate into a plurality of cut substrates, each cut substrate provided with an identifier;

a substrate identifier reader for reading the identifier of each cut substrate;

an unloader for sorting and storing the plurality of cut substrates to a second cassette according to the identifier of each cut substrate and a predetermined operating mode; and a system controller for receiving a request for operation information on each cut substrate from said unloader, and transmitting the operation information and operation commands to said unloader.

* * * * *